Aug. 11, 1964   D. W. MOORE   3,144,621
MULTIVIBRATOR PROVIDED WITH STABILIZING
SHOCK-EXCITED RESONANT CIRCUIT
Filed March 9, 1962
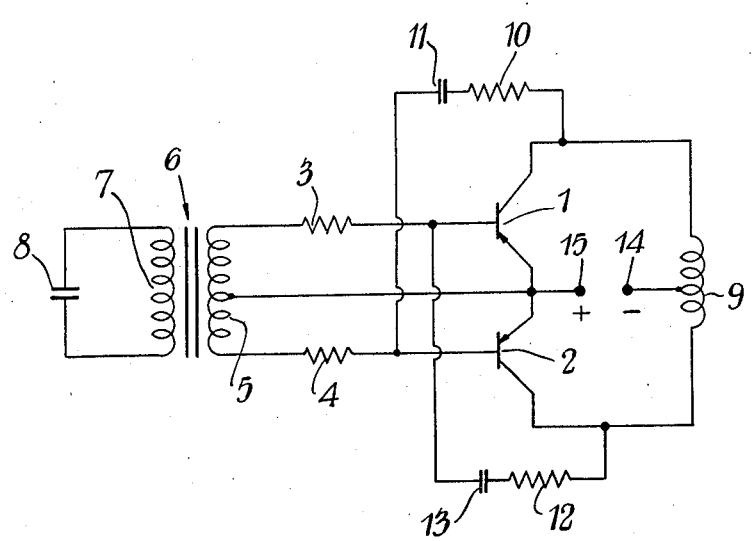
Inventor:
Derek Wilbur Moore
By Karel W. Flocks
Attorney

# United States Patent Office 3,144,621
Patented Aug. 11, 1964

3,144,621
MULTIVIBRATOR PROVIDED WITH STABILIZING SHOCK-EXCITED RESONANT CIRCUIT
Derek Wilbur Moore, Rexdale, Ontario, Canada, assignor to The De Havilland Aircraft Company Limited, Hatfield, England, a company of Great Britain
Filed Mar. 9, 1962, Ser. No. 178,725
Claims priority, application Great Britain Mar. 10, 1961
2 Claims. (Cl. 331—113)

This invention relates to improvements in electrical oscillators, in particular multivibrators.

According to the present invention, an electric oscillator comprises a pair of transistors the base electrodes of which are electrically connected to each other through the centre-tapped secondary winding of a transformer the primary winding of which is included in a resonant energy store and the centre tap of which is electrically connected to both emitter electrodes of the transistors, the collector electrodes of which are electrically connected to each other through the centre-tapped primary winding of an output transformer, and the collector electrode of each of which has a feed-back connection to the base electrode of the other transistor, each feed-back connection including a resistor and a capacitor connected in series, the emitter electrodes and the centre tap of the primary winding of the output transformer being adapted to be connected across a D.C. voltage source.

One embodiment of the invention will now be described by way of example, reference being made to the accompanying circuit diagram.

The multivibrator of this example comprises a pair of transistors 1 and 2 having their base electrodes electrically connected to each other through resistors 3 and 4 and the centre-tapped secondary winding 5 of a transformer indicated generally at 6. The primary winding 7 of the transformer 6 is connected in a resonant energy store which in this example is constituted by the primary winding 7 and a capacitor 8 connected thereacross to form a parallel tuned circuit. It will be apparent that other forms of resonant energy store may be employed.

The centre tap of the secondary winding 5 is electrically connected to the emitter electrodes of the transistors 1 and 2 which electrodes are strapped together. The collector electrodes of the transistors 1 and 2 are electrically connected to each other through the centre-tapped primary winding 9 of an output transformer. The collector electrode of the transistor 1 is connected to the base electrode of the transistor 2 through a feed-back connection comprising a resistor 10 and a capacitor 11 connected in series. Similarly, the collector electrode of the transistor 2 is connected to the base electrode of the transistor 1 through a feed-back connection comprising a resistor 12 and a capacitor 13. The centre tap of the winding 9 is connected to a terminal 14 and the emitter electrodes are connected to a terminal 15, the terminals 14 and 15 being adapted to have a D.C. voltage supply connected thereacross.

In the operation of the circuit described, the transistors 1 and 2 operate in the switching mode in a manner similar to a free-running multivibrator. Each time a transistor switches on and off the resonant store provided by the winding 7 and capacitor 8 is caused to ring by the pulses supplied thereto from the winding 5. The switching on and off of the transistors is initiated each time by the output of the resonant energy store which appears in the winding 7 and hence in the winding 5 and occurs each time this output approaches zero from either direction. The resonant energy store therefore controls closely the pulse repetition frequency of the output pulses produced in the winding 9. By selecting the values of the capacitors 11 and 13 and the resistors 10 and 12 to provide a relatively high loop gain, the transistors 1 and 2 can be caused to switch on and off very sharply thus producing short switching times and inherently improving the efficiency of the oscillator.

The detailed operation of the circuit can best be understood, by referring first to the operation of the resonant store provided by the transformer 6 and the capacitor 8. Thus, if electromagnetic energy is stored in the resonant store, it will be clear that if the capacitor is first fully charged in one sense it will discharge into the winding 7, thereby storing energy in the transformer 6 and inducing in the winding 5 an E.M.F. of a given polarity. Thereafter, the energy stored in the transformer 6 will be returned to the capacitor 8, to charge it in the relatively opposite sense. Next, the charged capacitor 8 will discharge into the winding 7, in a direction relatively opposite to its previous discharge, thereby against storing energy in the transformer 6 and inducing in the winding 5 an E.M.F. of a polarity relatively opposite to the given polarity. Finally, the energy now stored in the transformer 6 will be returned to the capacitor 8 to again charge it in the one sense, whereafter the cycle will be repeated.

When the D.C. voltage supply is connected between the terminals 14 and 15, an electric current tends to flow through the transistor 1, from emitter to collector and through the upper half of the winding 9; a similar electric current tends to flow through the transistor 2, from emitter to collector and through the lower half of the winding 9. If these two currents were identical in magnitude, no net potential difference would appear across the winding 9: therefore, no electric current would flow in the circuit from the upper terminal of the winding 9, via the resistor 10, the capacitor 11, the resistor 4, the winding 5, the resistor 3, the capacitor 13, and the resistor 12, to the lower terminal of the winding 9. If then, the two currents were identical in magnitude, the absence of electric current in the circuit just mentioned would prevent any bias from being supplied to the base of either of the transistors 1 and 2.

In practice, however, the transistors 1 and 2 will not be identical in their characteristics, so that one of the two currents just mentioned will be larger than the other. Supposing the larger current to be that which flows through the transistor 1, then it will be clear that the potential difference developed by this current in the upper half of the winding 9 will exceed the potential difference developed by the smaller current in the lower half of the winding 9. A resultant E.M.F. can therefore be considered to be present in the upper half of the winding 9, and this resultant E.M.F. will cause a pulse of current to flow, from the upper terminal of the winding 9, through the resistor 10, the capacitor 11 and the resistor 4, and through the lower half of the winding 5 to the centre point of the winding 5; here, the pulse of current divides: one portion will pass through the supply 14, 15 to the centre point of the winding 9, and the other portion will pass, through the resistor 3, the capacitor 13 and the resistor 12, to the lower terminal of the winding 9.

This pulse of current produces three effects. Firstly, the flow of current will produce a potential difference across the resistor 4 and the lower half of the winding 5, of such a polarity that the base of transistor 2 will be positively biassed relatively to the emitter, thus tending to cut off the transistor 2: this action will reduce the emitter-collector current of the transistor 2 and so increase the effective value of the resultant E.M.F. which may be considered to be developed in the upper half of the winding 9. Secondly, the flow of current will produce a potential difference across the resistor 3 and the upper half of the winding 5, of such a polarity that the base of transistor 2 will be negatively biassed relatively to the emitter, thus tending to bottom transistor 1: this action will increase the emitter-collector current of the transistor 1 and so further increase the effective value of the resultant E.M.F. which may be considered to be developed in the upper half of the winding 9. It should be noted that the effective increase of this resultant E.M.F. will further increase the magnitude of the current pulse being discussed, so that transistor 2 will be cumulatively driven towards cut-off, and transistor 1 will be cumulatively driven towards a bottomed state. Thirdly, the increasing pulse of current, in passing through the winding 5 of the transformer 6, will transfer electromagnetic energy to the transformer 6, so storing resonant energy in the resonant energy store comprising the capacitor 8 and the transformer 6.

Operation of the oscillator is thus commenced. During subsequent operation, it will be clear that the capacitor 8 periodically discharges into the winding 7, each discharge being in a relatively opposite direction to the preceding discharge; consequently, at periodic intervals, E.M.F.s are generated in the winding 5 of the transformer 6, which are alternately of opposite polarity. Subsequent to the starting action described in the preceding paragraph, a change of state of the circuit will next occur when the E.M.F. so generated in the winding 5 is of such a polarity that it tends to bias the base of the transistor 1 positively to cut off that transistor, and also tends to bias the base of the transistor 2 negatively to bottom that transistor. Under such conditions, a resultant E.M.F. can be considered, as before, to be developed in the winding 9: this resultant E.M.F. will be of relatively opposite polarity to that discussed above, and will now be developed in the lower half of the winding 9. A corresponding pulse of current will consequently flow, as described above, but in this case the current pulse will flow in the relatively opposite direction through the winding 5, in fact in the direction from top to bottom of the winding 5. The current pulse will increase cumulatively, as before and will transfer further energy to the resonant energy store, tending to maintain the store of electromagnetic energy in that store.

It will be appreciated that the repetition frequency of the output pulses of the oscillator and the stability of the latter are independent of transistor parameters.

It will also be appreciated that the repetition frequency of the oscillator is controlled by the tuned frequency of the resonant store and may be varied by varying the latter.

The pulse width of the output pulses may be controlled by connecting between the centre tap of the winding 5 and the emitter electrodes a biassing source of D.C. voltage in series with an impedance which may take any suitable form, instead of the direct connection illustrated.

What I claim is:

1. An electric oscillator comprising a pair of transistors each having emitter, base and collector electrodes, a coupling transformer having a centre-tapped secondary winding, an electrical connection between one base electrode and one end terminal of the secondary winding, an electrical connection between the other base electrode and the other end terminal of the secondary winding, an electrical connection from said centre-tap of the secondary winding to both emitter electrodes, an output transformer having a centre-tapped primary winding, an electrical connection between one collector electrode and one end terminal of the primary winding, an electrical connection between the other collector electrode and the other end terminal of the primary winding, a D.C. voltage source connected between said centre-tap of the primary winding and both emitter electrodes, a first feedback connection, comprising a resistor and a capacitor connected in series, from said one collector electrode to said other base electrode, a second feedback connection, comprising a resistor and a capacitor connected in series, from said other collector electrode to said one base electrode, and a resonant energy store inductively coupled to said secondary winding to permit shock excitation of the resonant energy store by electric currents flowing in said secondary winding and to permit the resonant energy store to induce voltages in said secondary winding to control the frequency of the oscillator.

2. An oscillator according to claim 1 wherein the coupling transformer has a primary winding which is included in the resonant energy store, and the resonant energy store includes a capacitor connector across the primary winding of the coupling transformer to form a parallel tuned circuit.

References Cited in the file of this patent

UNITED STATES PATENTS

| | | |
|---|---|---|
| 2,547,523 | Eicher | Apr. 3, 1951 |
| 2,643,340 | Lawrance | June 23, 1953 |
| 2,782,309 | Aasma | Feb. 19, 1957 |
| 2,883,539 | Bruck et al. | Apr. 21, 1959 |